US008639514B2

(12) United States Patent
Urso

(10) Patent No.: US 8,639,514 B2
(45) Date of Patent: Jan. 28, 2014

(54) METHOD AND APPARATUS FOR ACCESSING INFORMATION IDENTIFIED FROM A BROADCAST AUDIO SIGNAL

(75) Inventor: Richard Urso, Fair Haven, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1147 days.

(21) Appl. No.: 12/338,566

(22) Filed: Dec. 18, 2008

(65) Prior Publication Data

US 2010/0157744 A1 Jun. 24, 2010

(51) Int. Cl.
*G10L 15/04* (2013.01)

(52) U.S. Cl.
USPC .......... 704/270.1

(58) Field of Classification Search
USPC .......... 704/230–257, 270, 270.1
See application file for complete search history.

(56) References Cited

U.S. PATENT DOCUMENTS

| | | | | |
|---|---|---|---|---|
| 5,303,393 | A | 4/1994 | Noreen et al. | |
| 5,455,823 | A | 10/1995 | Noreen et al. | |
| 5,689,245 | A | 11/1997 | Noreen et al. | |
| 5,946,050 | A * | 8/1999 | Wolff | 348/553 |
| 6,249,765 | B1 * | 6/2001 | Adler et al. | 704/500 |
| 6,507,643 | B1 * | 1/2003 | Groner | 379/88.14 |
| 6,606,596 | B1 * | 8/2003 | Zirngibl et al. | 704/270 |
| 6,651,043 | B2 * | 11/2003 | Ammicht et al. | 704/275 |
| 7,167,545 | B2 * | 1/2007 | Plannerer et al. | 379/88.01 |
| 7,222,071 | B2 | 5/2007 | Neuhauser et al. | |
| 7,319,862 | B1 | 1/2008 | Lincoln et al. | |
| 2001/0011217 | A1 * | 8/2001 | Ammicht et al. | 704/231 |
| 2002/0019734 | A1 * | 2/2002 | Bartosik | 704/231 |
| 2002/0041659 | A1 * | 4/2002 | Beswick et al. | 379/88.01 |
| 2002/0196910 | A1 * | 12/2002 | Horvath et al. | 379/88.01 |
| 2004/0019487 | A1 * | 1/2004 | Kleindienst et al. | 704/270.1 |
| 2004/0027271 | A1 | 2/2004 | Schuster et al. | |
| 2004/0215451 | A1 * | 10/2004 | Macleod | 704/231 |
| 2005/0203914 | A1 | 9/2005 | Bryant et al. | |
| 2005/0251394 | A1 * | 11/2005 | Carro | 704/270.1 |
| 2005/0278736 | A1 * | 12/2005 | Steelberg et al. | 725/34 |
| 2008/0016142 | A1 * | 1/2008 | Schneider | 709/203 |
| 2008/0060037 | A1 * | 3/2008 | Isaacson | 725/113 |

FOREIGN PATENT DOCUMENTS

| | | |
|---|---|---|
| WO | WO 0143364 | 6/2001 |

OTHER PUBLICATIONS

"Shazam—The Amazing Music Discovery Engine", downloaded from hdp://www.shazam.com/music/web/pages/background.html., on Nov. 17, 2008.

* cited by examiner

*Primary Examiner* — Abul Azad
(74) *Attorney, Agent, or Firm* — Wolff & Samson, PC

(57) ABSTRACT

A method and device for accessing information identified from a broadcast audio signal receives a broadcast audio signal from a receiver such as a radio or television. Identifiers such as telephone numbers, URLs, e-mail addresses, and keywords are recognized and stored for immediate or later use by a user. An external network device identified by a recognized identifier is accessed based on user selection of a recognized identifier.

27 Claims, 3 Drawing Sheets

METHOD AND APPARATUS FOR ACCESSING INFORMATION IDENTIFIED FROM A BROADCAST AUDIO SIGNAL

BACKGROUND OF THE INVENTION

The present invention relates generally to information retrieval, and more particularly to accessing information identified from a broadcast audio signal.

Audio information is typically conveyed to a listener in real time without the ability to slow or pause the presentation of the information. Audio information presented in this manner requires a user to remember the audio information after it is presented in order to utilize the information. For example, a person listening to a radio broadcast is typically presented with commercial information over a short interval (e.g. thirty seconds) and the listener must receive and remember information such as names, phone numbers, URL, and e-mail addresses in order to respond to the audio broadcast or obtain further information regarding the subject of the audio broadcast. While the audio information presented to a user can be written down, it is inconvenient to carry the tools necessary to record or memorialize the information such as a recorder or pen and paper. In addition, audio information is often presented while listeners are engaged in activities that inhibit the listener's ability to capture the audio information via pen and paper (e.g. listening to a radio broadcast while driving.)

Once listeners record the desired information contained in the audio broadcast, the listener must take one or more steps to utilize the recorded information. For example, after a listener memorizes or records a phone number for a restaurant or other eating establishment provided during an audio broadcast, the user must then dial the number provided to be connected to the restaurant. The listener may have to perform other actions in order to access information related to the subject of an audio broadcast depending on the type of information provided. For example, if a URL or e-mail address is provided during the audio broadcast, the listener must remember or record the URL or e-mail and then enter it into a computer in order to access a website or send an email.

In some instances, an audio broadcast will not include a phone number, URL, or e-mail address. In these instances, the user may need to search for contact information related to the content of the audio broadcast. For example, a vehicle manufacturer may advertise a new model by providing listeners with make and model but omitting any information such as a URL or phone number to obtain additional information. In these instances, listeners may use an Internet search engine such as Google or Yahoo to locate websites that contain additional information concerning the product or service identified in the audio broadcast.

BRIEF SUMMARY OF THE INVENTION

The inventor has overcome the issues described above by providing a method of automatically identifying and storing URLs, e-mail addresses, phone numbers, and keywords contained in audio broadcasts and accessing a remote network device based on the information contained in the audio broadcast.

The present invention, in one embodiment, is a method for accessing information identified from a broadcast audio signal. The method includes the step of receiving perceptible speech from the broadcast audio signal and recognizing an identifier in the received perceptible speech. Data representing the recognized identifier is stored and an external network device identified by the identifier is accessed.

In another embodiment, a device for storing information related to the content of an audio signal includes an audio receiver configured to receive perceptible speech from a broadcast audio signal. An identifier recognition module in communication with the audio receiver is configured to recognize an identifier in the received perceptible speech. A memory in communication with the identifier recognition module is configured to store data representative of the recognized identifier and an access module in communication with the memory is configured to access an external network device identified by an identifier.

These and other advantages of the invention will be apparent to those of ordinary skill in the art by reference to the following detailed description and the accompanying drawings.

DETAILED DESCRIPTION

Figure 1:
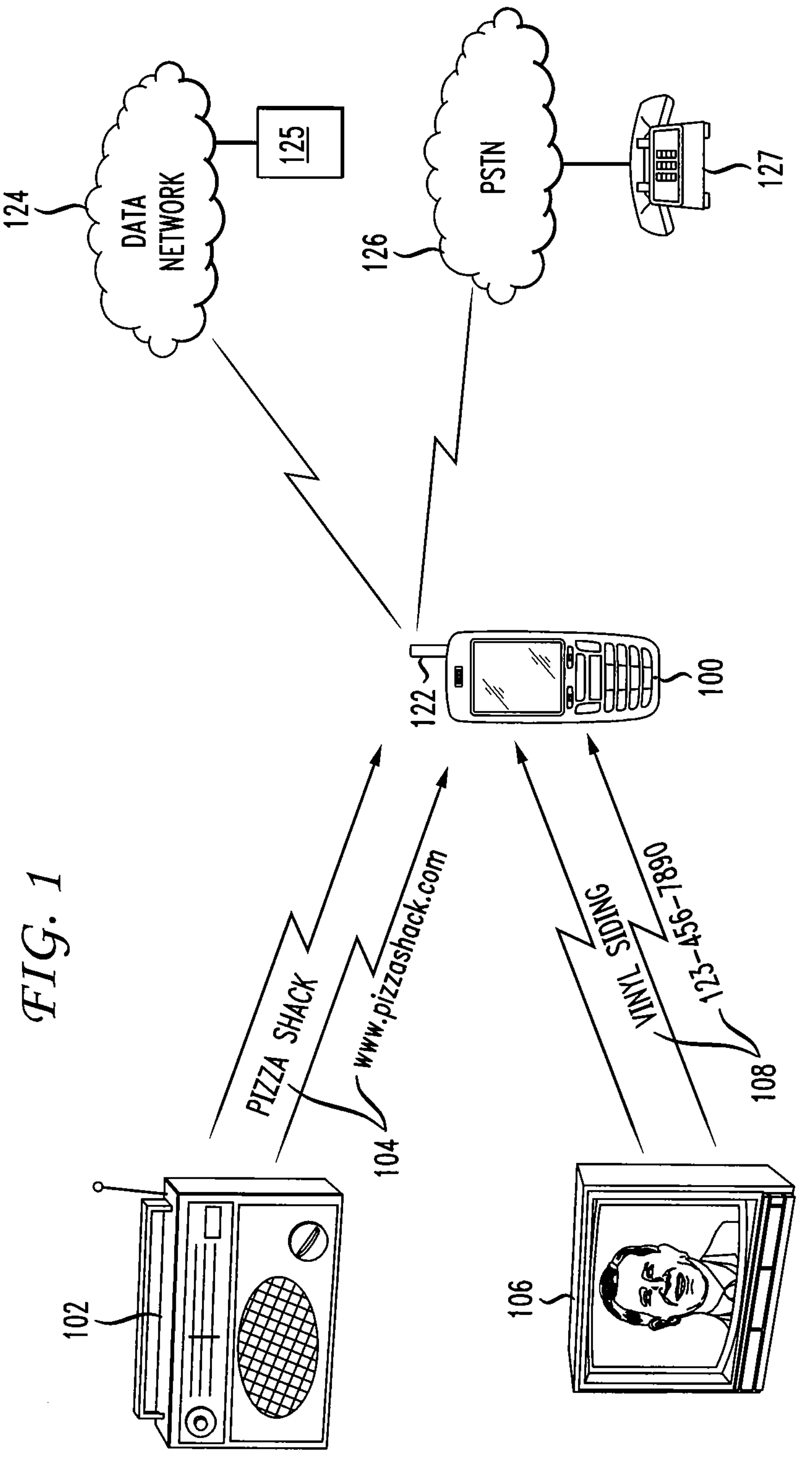
FIG. 1 shows a mobile communication device in communication with external network devices and receiving perceptible speech contained in broadcast audio signals output from broadcast receivers in accordance with one embodiment of the invention.

FIG. 1 shows mobile communication device 100 located in the vicinity of broadcast receivers, in this embodiment, radio 102 and television 106. Mobile communication device 100 receives broadcast audio signals 104 and 108 output from broadcast receivers 102 and 106. Mobile communication device 100 is adapted to communicate wirelessly via antenna 122 with external network devices such as, in this embodiment, data server 125 and telephone 127 via data network 124 and Public Switched Telephone Network (PSTN) 126 respectively. In other embodiments, mobile communication device 100 may communicate with other external network devices such as, for example, computers, cell phones, or personal digital assistants over other networks such as, for example, Global Systems for Mobile Communications (GSM), Personal Communication Service (PCS), or Digital Advanced Mobile Phone Service (DAMPS).

Figure 2:
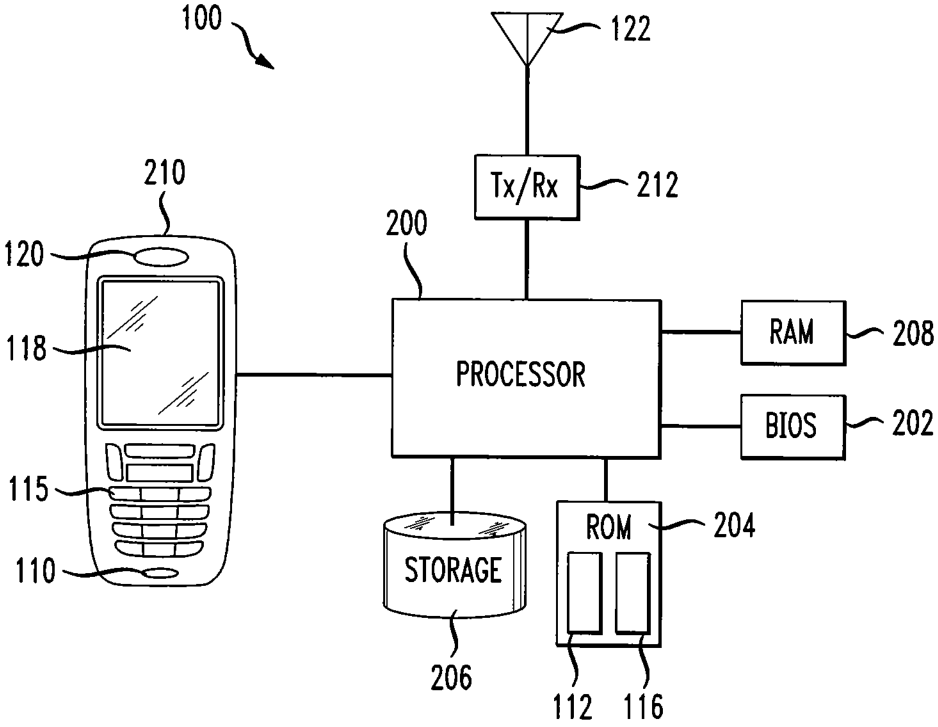
FIG. 2 is a high level diagram showing the components contained in a mobile communication device configured to access information identified from a broadcast audio signal according to one embodiment of the present invention.

FIG. 2 shows a high level diagram of the components contained in mobile communication device 100 of FIG. 1. Mobile communication device 100 contains processor 200 which is in communication with Basic input/output system (BIOS) device 202. BIOS device 202 contains a Basic input/output system (BIOS) which consists of program instructions for identifying and initializing one or more devices in communication with processor 200 such as read only memory (ROM) 204. Processor 200 controls the overall operation of mobile communication device 100 by executing computer program instructions which define such operation. The computer program instructions may be stored in ROM 204, storage device 206, or other computer readable medium (e.g., magnetic disk, CD ROM, etc.), and loaded into memory, in this embodiment, Random Access memory (RAM) 208, when execution of the computer program instructions is desired. The method steps of FIGS. 3 and 4 (described below)

can be defined by the computer program instructions stored in the ROM 204 and/or storage 206 and controlled by the processor 200 executing the computer program instructions. For example, the computer program instructions can be implemented as computer executable code programmed by one skilled in the art to perform an algorithm defined by the method steps of FIGS. 3 and 4. Accordingly, by executing the computer program instructions, the processor 200 executes an algorithm defined by the method steps of FIGS. 3 and 4.

ROM 204 is shown including identifier recognition module 112 and access module 116, the operation of which is described below. In this embodiment, identifier recognition module 112 and access module 116 are implemented in software stored in ROM 204 but may alternatively be stored in storage 206. In other embodiments, identifier recognition module 112 and access module 116 may be implemented using application specific hardware such as an additional IC or other electronic component or a combination of hardware and software.

Mobile communication device 100 also includes transceiver 212 and antenna 122 for communicating with external network devices 125 and 127 via networks 124 and 126 shown in FIG. 1. Mobile communication device 100 is shown having Input/Output (I/O) 210 that enable user interaction with device 100. I/O 210 includes an acoustic to electric transducer (also referred to as an audio receiver) which is, in one embodiment, microphone 110. Microphone 110 is configured to receive broadcast audio signals 104 and 108 from broadcast receivers 102 and 106 (shown in FIG. 1) and transmit signals representing received audio signals to processor 200. Microphone 110 may also receive audio signals from other sources, such as a user, to facilitate other functionality such as use of mobile communication device 100 as a telephone. I/O 210 is shown including buttons 115 for facilitating user input, display 118 for displaying information, and speaker 120 for outputting audio signals. In other embodiments, I/O 210 may include other I/O devices such as a full QWERTY keypad/keyboard and a touch screen display or combinations of I/O devices. One skilled in the art will recognize that an implementation of mobile communication device 100 could contain other components as well, and that FIG. 2 is a high level representation of some of the components of such a mobile communication device for illustrative purposes.

Figure 3:
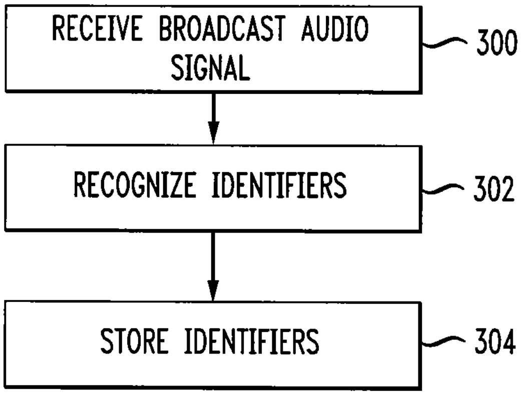
FIG. 3 is a flowchart illustrating a method according to one embodiment of the present invention.

FIG. 3 shows a method for recognizing and storing identifiers from a broadcast audio signal according to one embodiment of the present invention and will be described in conjunction with FIGS. 1 and 2.

Audio signals are broadcast to receivers, for example, radio 102 and television 106. The audio signals broadcast to receivers are typically RF signals transmitted from broadcast stations such as radio or television stations. Audio signals may also be transmitted to broadcast receivers using other methods such as transmission via cable as used with cable television. The audio signals are received by receivers 102 and 106 and converted into broadcast audio signals 104 and 108 which are acoustic audio signals. In step 300, broadcast audio signals 104 and 108 are received by an acoustic to electric transducer, in this case microphone 110.

The broadcast audio signals output from radio 102 and television 106 typically contain broadcast content comprised of entertainment portions separated by commercial portions. These commercial portions typically contain advertisements describing various products and services. These advertisements generally provide listeners with a method for obtaining the product or service or for obtaining further information concerning the product or service. For example, broadcast audio signal 104 illustrates the phrases "Pizza Shack" and "www.pizzashack.com" output from radio 102. Other phrases such as "vinyl siding" and "123-456-7890" shown in broadcast audio signal 108 may be output from a broadcast receiver such as television 106. It should be noted that although the embodiments described herein focus on the advertisement portions of broadcasts, the methods and devices described herein may also recognize identifiers contained in the non-commercial portions of broadcasts as well.

The broadcast audio signals received in step 300 are converted from acoustic signals to electrical signals by microphone 110 and transmitted to identifier recognition module 112. Identifier recognition module 112 is configured to recognize perceptible speech contained in broadcast audio signals received by microphone 110.

Perceptible speech may be recognized in a variety of ways including, but not limited to, speaker independent voice recognition and speaker dependent voice recognition. Speaker independent voice recognition techniques can recognize a relatively small number of words from nearly any speaker with high accuracy provided the speaker is constrained to a small number of responses. Accuracy declines if the speaker's response choice is not constrained, or if there is not enough separation between words. Speaker dependent voice recognition can recognize a large vocabulary from a single speaker, but this typically requires training the recognition unit by having the speaker say a word and correct the recognition unit if it misinterprets it. An embodiment of the present invention may use either speaker independent or speaker dependent voice recognition techniques depending on, for example, the anticipated content of the broadcast audio signals. In one embodiment, a mix of speaker dependent and speaker independent voice recognition techniques may be implemented, for example, as described below.

The speaker independent component of the recognition is tuned to recognize numbers and certain keywords with high accuracy, sacrificing accuracy of other words if necessary. The speaker dependent component allows specific words from specific speakers to be interpreted with high accuracy. This speaker dependent component facilitates the use of keywords spoken by a specific voice. The keywords provided in this manner support recognition with a high degree of accuracy. The mix of speaker dependent with speaker independent voice recognition is, in one embodiment, facilitated by running both types of recognition and producing two sets of results. In other embodiments, the results of both the speaker independent and speaker dependent components of the voice recognition are analyzed and combined to provide a single set of results.

In one embodiment, the speaker dependent component of the voice recognition is modified and/or updated periodically via file downloads similar to the way other mobile device functions and capabilities are modified and/or updated. Downloaded modifications and updates to the speaker dependent component can enhance the high accuracy recognition aspect of the speaker dependent component of the voice recognition.

Module 112 is further configured to recognize identifiers contained in the recognized perceptible speech as indicated in step 302. Identifiers may be the terms or phrases contained in a portion of broadcast audio signals 104 and 108 which allow action to be taken based on the content of the portion of the broadcast audio signal. Identifiers may also be terms or phrases that represent the subject of a particular portion of a broadcast audio signal. Identifiers may also be a term or phrase representing a method of contacting an entity associated with the subject of a broadcast audio signal. Identifiers may be, for example, telephone numbers, URLs, e-mail addresses, or keywords. For example, a "Pizza Shack" commercial advertising the foods available from a local store may include a phone number for placing orders. The identifier recognition module recognizes a string of numbers comprising a telephone number contained in the recognized perceptible speech. The string of numbers may be recognized as a telephone number if the string is seven, ten, or eleven digits long (e.g. local phone numbers providing the seven digit phone number, numbers including an area code designation providing ten digits, or eleven digit numbers provided with a one preceding a ten digit telephone number). Toll-free numbers may be recognized conventionally as a string of digits or by a string of digits preceded by the phrase "1-800." Telephone numbers provided in a format in which one or more of the numbers is replaced with one of the letters associated with the number on a telephone number pad may be recognized as a phone number by digits preceding, following, or interspersed with a word such as in the phone numbers "1-800-PIZZA4U" or "1-800-CALLBOB" which are interpreted as the numbers 1-800-749-9248 and 1-800-225-5262 respectively.

Identifier recognition module 112 may also recognize a Uniform Resource Locator ("URL") such as "www.pizzashack.com." URLs may be recognized in the perceptible speech by the phrases "www dot", "dot com", "dot net" etc. By recognizing one of the foregoing phrases, the identifier recognition module can identify an entire phrase as a URL. Email addresses may be identified by the identifier recognition module 112 by the term "at" followed by a phrase ending with "dot com", "dot net", etc.

Identifier recognition module 112 may also recognize one or more keywords as identifiers. A keyword is typically a term or phrase contained in a portion of a broadcast audio signal having a frequency of occurrence that is higher than would be expected to occur by chance alone. These keywords may be identified by the location of the keywords relative to one another, the frequency of the keywords, or the context in which the keyword are used. For example, an advertisement for a new model vehicle may contain various phrases related to the styling, safety, performance, and price of the vehicle but may lack any contact information such as a phone number, URL, or email address. In this example, the terms representing the make and model of the vehicle may be designated as keywords based on their use in the audio signal, their location in the audio signal, frequency of occurrence, or other methods of identifying keywords known by one of ordinary skill in the art. Methods of identifying keywords are well known in the art and will not be described further.

Data representative of identifiers recognized by identifier recognition module 112 in step 302 of FIG. 3 are then stored in either RAM 208 or storage 206 (shown in FIG. 2) as indicated by step 304. For example, a portion of a broadcast audio signal recognized as a phone number would be stored in RAM 208 as a string of digits and not as an acoustic file such as a .WAV file. Similarly, keywords, URLs, and e-mail addresses are stored in RAM 208 as alphanumeric strings and not acoustic files. In one embodiment, recognized identifiers are stored in a database with information related to the recognized identifiers such as date and time the audio signals containing the identifiers were received by microphone 110. The database may also contain information related to the recognized identifiers such as the location of the mobile communication device at the time the audio signals containing the identifier was received using a GPS receiver. This additional information may be used to further define the stored identifiers. For example, the location of the mobile communication device at the time an identifier relating to an advertisement to a national chain or franchise is received may be used to determine the store closest to the location of the mobile communication device. In addition to being stored in memory, in one embodiment, identifiers recognized by module 112 are also output to display 118 for viewing by a user.

Speech recognition accuracy and speed typically depend on processor speed and availability. In one embodiment, processor usage is reduced by storing the received broadcast audio signal and performing speech and identifier recognition only when requested by a user. The broadcast audio signal received over a predetermined time period may be stored in memory, such as RAM 208 or storage 206. In one embodiment, the received broadcast audio signal may be stored in a rolling or logically circular buffer capable of storing a predetermined duration of the broadcast audio signal. For example, the last thirty seconds of the received broadcast signal may be stored in the rolling buffer. In one embodiment, a user input, such as a button press, causes speech and identifier recognition to be performed on the broadcast audio signal stored in the rolling buffer at the time the user input is received.

Other techniques may be utilized to overcome the speed and availability limitations of processor 200. In one embodiment, received broadcast audio signals may be transmitted to an external device for processing. For example, in one embodiment, an external server is configured to receive broadcast audio signals from a plurality of mobile communication devices 100. The external server is further configured to perform speech and/or identifier recognition of the broadcast audio signals received from one of the plurality of mobile communication devices and transmit the results of the recognition to the mobile communications device from which the broadcast audio signals were received. Other variations may be used in other embodiments. For example, in one embodiment, speech and identifier recognition may be performed by an external device which receives a broadcast audio signal from a mobile communications device in response to a user input received by the mobile communications device, the user input representing a user selection of a portion of the broadcast audio signal received by the mobile communications device to be analyzed. In another embodiment, speech and identifier recognition may be performed on some portions of the received broadcast audio signal by processor 200 contained in mobile communications device 100 and some portions of the received broadcast audio signal may be transmitted to the external server for analysis.

Figure 4:
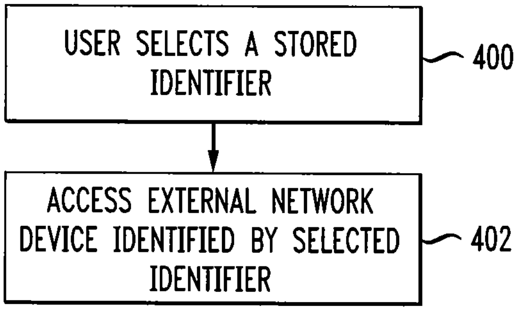
FIG. 4 is a flowchart illustrating a method according to one embodiment of the present invention.

FIG. 4 shows a method for selecting a stored identifier identified from a broadcast audio signal and accessing an external device identified by the selected identifier according to one embodiment of the present invention and will be described in conjunction with FIGS. 1 and 2.

The identifiers stored by mobile communications device 100 may be reviewed by a user via a user interface which, in this embodiment, consists of buttons 115 and display 118. The recognized identifiers stored in memory (RAM 208 or storage 206) are displayed, in this embodiment, via display 118 from latest to earliest. The latest recognized identifier may be presented in bold, or otherwise highlighted, and may be selected by the user for storage or immediate action (i.e. dialing a phone number, accessing a website, initiating a search, or opening an email client as described above) by pressing one of buttons 115. A user may also scroll through the list of stored identifiers using buttons 115. A user may then select a stored identifier as indicated by step 400 of FIG. 4 using one of buttons 115. Mobile communication device 100 then accesses an external network device (in communication with one of data network 124 or PSTN126) identified by the selected identifier using access module 116, transceiver 212, and antenna 122.

The specific external network that mobile communication device 100 accesses is based on the identifier selected. For example, if a user selects a stored identifier representing the phone number of a local "Pizza Shack", mobile communication device 100 will dial the phone number thereby connecting the user with the local "Pizza Shack" via PSTN 126. If the selected identifier is a URL, the mobile communication device will open a browser such as Microsoft Internet Explorer and navigate to the URL associated with the user selected identifier via data network 124. If the stored identifier is a keyword, mobile communications device 100 connects with an Internet search engine such as Google via data network 124 and displays the results of a search on display 118, the results of the search based on the keyword associated with the selected identifier. A user may then access one or more of the links associated with the results of the search based on the keyword associated with the selected identifier. If the stored identifier is an email address, selection of the identifier by the user, in one embodiment, opens an email template of a mail client such as Microsoft Outlook with the stored identifier email address inserted in the "to" line of the email template.

Other methods of presenting and responding to recognized identifiers may be used as well. For example, in one embodiment, identifiers are presented to a user via display 118 as the identifiers are recognized by identifier recognition module 112. In this embodiment, recognized identifiers are not stored or utilized unless an input is received by a user via one of buttons 115. In embodiments where the identifiers are not automatically stored, an identifier currently displayed via display 118 is stored in response to a user actuating one of buttons 115 designated as a "store identifier" button. Similarly, in embodiments where the identifiers are not automatically stored, a user may initiate accessing of an external network device identified by the identifier displayed via display 118 in response to a user actuating one of buttons 115 designated as an "access" button.

In one embodiment, a broadcast audio signal received by a mobile communications device is transmitted to an external server configured to store and present information related to the broadcast audio signal in a variety of ways. For example, the broadcast audio information, in one embodiment, is converted to text and added to a webpage accessible by a user. In another embodiment, identifiers recognized from the broadcast audio signal are displayed on a webpage. The webpage may also be configured to display information related to the recognized identifiers such as links to other webpages or content retrieved from other sources.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for accessing information identified from a broadcast audio signal, the method comprising:

receiving the broadcast audio signal;

storing a portion of the broadcast audio signal in a buffer;

receiving a first user input, comprising speech, at a particular time during broadcast of the broadcast audio signal;

recognizing an identifier in perceptible speech of the portion of the broadcast audio signal that is in the buffer at the particular time in response to receiving the first user input;

storing data representative of the identifier; and accessing an external network device identified by the identifier.

2. The method of claim 1 wherein the identifier comprises a uniform resource locator.

3. The method of claim 1 wherein the identifier comprises a telephone number.

4. The method of claim 1 wherein the identifier comprises an e-mail address.

5. The method of claim 1 wherein the identifier comprises a keyword.

6. The method of claim 1 wherein the storing data representative of the identifier is in response to a second user input selecting a particular identifier.

7. The method of claim 1 wherein the accessing is in response to a second user input selecting a particular identifier.

8. A device for storing information related to the content of an audio signal, the device comprising:

a processor; and a memory to store computer program instructions, the computer program instructions when executed on the processor cause the processor to perform operations comprising:

receiving a broadcast audio signal;

storing a portion of the broadcast audio signal in a buffer;

receiving a first user input, comprising speech, at a particular time during broadcast of the broadcast audio signal;

recognizing an identifier in perceptible speech of the portion of the broadcast audio signal that is in the buffer at the particular time in response to receiving the first user input;

storing data representative of the identifier; and accessing an external network device identified by the identifier.

9. The device of claim 8 wherein the identifier comprises a uniform resource locator.

10. The device of claim 8 wherein the identifier comprises a telephone number.

11. The device of claim 8 wherein the identifier comprises an e-mail address.

12. The device of claim 8 wherein the identifier comprises a keyword.

13. The device of claim 8, the operations further comprising receiving a second user input.

14. The device of claim 13 wherein the second user input is representative of a user selection of a particular identifier.

15. A computer readable storage device storing computer program instructions for accessing information identified from a broadcast audio signal, the computer program instructions when executed on a processor, cause the processor to perform operations comprising:

receiving the broadcast audio signal;

storing a portion of the broadcast audio signal in a buffer;

receiving a first user input, comprising speech, at a particular time during broadcast of the broadcast audio signal;

recognizing an identifier in perceptible speech of the portion of the broadcast audio signal that is in the buffer at the particular time in response to receiving the first user input;

storing data representative of the identifier; and accessing an external network device identified by the identifier.

16. The computer readable storage device of claim 15 wherein the identifier comprises a uniform resource locator.

17. The computer readable storage device of claim 15 wherein the identifier comprises a telephone number.

18. The computer readable storage device of claim 15 wherein the identifier comprises an e-mail address.

19. The computer readable storage device of claim 15 wherein the identifier comprises a keyword.

20. The computer readable storage device of claim 15 wherein the storing data representative of the identifier is in response to a second user input selecting a particular identifier.

21. The computer readable storage device of claim 15 wherein the accessing is in response to a second user input selecting a particular identifier.

22. An apparatus for accessing information identified from a broadcast audio signal, the apparatus comprising:

a processor; and a memory to store computer program instructions, the computer program instructions when executed on the processor cause the processor to perform operations comprising:

receiving the broadcast audio signal;

storing a portion of the broadcast audio signal in a buffer;

receiving a first user input, comprising speech, at a particular time during broadcast of the broadcast audio signal;

recognizing an identifier in perceptible speech of the portion of the broadcast audio signal that is in the buffer at the particular time in response to receiving the first user input;

storing data representative of the identifier; and accessing an external network device identified by the identifier.

23. The apparatus of claim 22 wherein the identifier comprises a uniform resource locator.

24. The apparatus of claim 22 wherein the identifier comprises a telephone number.

25. The apparatus of claim 22 wherein the identifier comprises an e-mail address.

26. The apparatus of claim 22 wherein the identifier comprises a keyword.

27. The apparatus of claim 22, the operations further comprising receiving a particular second user input representative of a user selection of a particular identifier.

* * * * *